Aug. 31, 1954 — L. MARICK — 2,687,761
INNER TUBE
Filed July 6, 1951 — 2 Sheets-Sheet 1
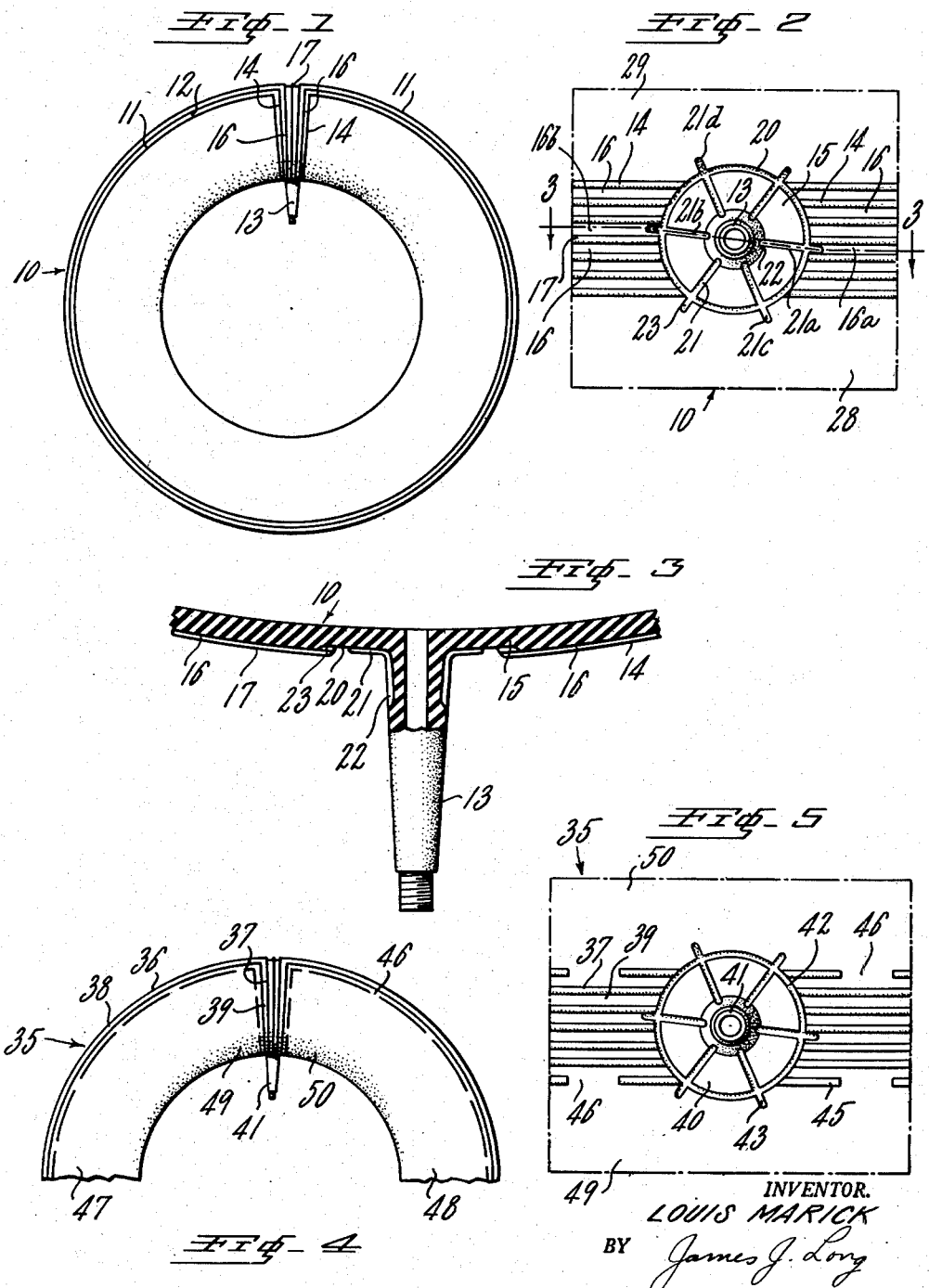
INVENTOR.
LOUIS MARICK
BY James J. Long
AGENT Aug. 31, 1954　　　L. MARICK　　　2,687,761
INNER TUBE
Filed July 6, 1951　　　　　　2 Sheets-Sheet 2

INVENTOR.
LOUIS MARICK
BY James J. Long
AGENT

Patented Aug. 31, 1954

2,687,761

UNITED STATES PATENT OFFICE 2,687,761

INNER TUBE

Louis Marick, Grosse Pointe Farms, Mich., assignor to United States Rubber Company, New York, N. Y., a corporation of New Jersey Application July 6, 1951, Serial No. 235,457

6 Claims. (Cl. 152—349)

This invention relates to inner tubes, and more particularly it relates to an inner tube embodying means for venting, that is, for providing for escape of fluid, such as air and water, from between the inner tube and the tire casing when the tire is mounted on a wheel.

Pneumatic tires are subject under certain conditions of use to failures caused by carcass deterioration sometimes referred to as "puncture flex breaks." Such failure of the tire is characterized by extreme chafing of the carcass at the area of the failure and the carcass cords in such area are observed to be upraised and broken and frayed. This type of failure is particularly dangerous in that it occurs suddenly without warning in the form of a sudden "blowout" with virtually instantaneous loss of tire pressure. It has been determined that the puncture flex break is occasioned by the presence of water entrapped between the inner tube and the tire casing. Such water may be present by accidental inclusion at the time the tire was mounted on the wheel, for example, if the tire has been stored outdoors, or mounted outdoors in wet weather, or the water may come from an excess of soap solution used to facilitate mounting the tire. Also, water may find its way between the casing and tube through a small nail hole or the like when the tire is in use. Once even a small quantity of water is entrapped between the casing and tube it tends to form a pocket of water, which, under the influence of the pressure and continual mechanical working going on inside the tire, gradually works itself into the carcass cords. Such moisture in the carcass cords, particularly in the case of rayon cords, is deleterious to the bond between the carcass rubber and the cord, with the result that the cords eventually work loose, becoming abraded against each other and against the inner tube, and finally break. For this reason it has been desired to provide more effective means than has heretofore been available to prevent entrapment or inclusion of water between the inner tube and the tire casing.

Accordingly, the principal object of the invention is to provide a means for reducing carcass deterioration, or the puncture flex break type of failure, occasioned by the presence of pockets of water between the inner tube and tire casing.

Another object is the provision of an improved means for venting fluid, especially water, from between an inner tube and a tire casing.

Still another object is to provide a means whereby air, and especially water, entrapped between an inner tube and a tire casing is permitted egress to a venting system from all of the surface areas of the inner tube.

A further object is the provision of a system for leading water or air collected circumferentially and radially of the tube to the valve opening in a wheel rim.

Still a further object is to provide a venting system for inner tubes which is not interfered with by any slight flash or ridges formed at the parting line of the mold in which the tube is cured.

The foregoing objects, and additional objects and advantages, will be made evident in the following detailed description of the invention, which is intended to be read with reference to the accompanying drawings, wherein Fig. 1 is an elevational view of an inner tube embodying a venting system of the invention;

Fig. 2 is a fragmentary plan view on a larger scale of the inner tube in the region of the valve stem;

Fig. 3 is a fragmentary sectional elevation taken substantially along line 3—3 of Fig. 2;

Fig. 4 is a fragmentary elevational view of an inner tube embodying a modification of the invention;

Fig. 5 is a fragmentary plan view on a larger scale of the modification shown in Fig. 4;

Figure 6:
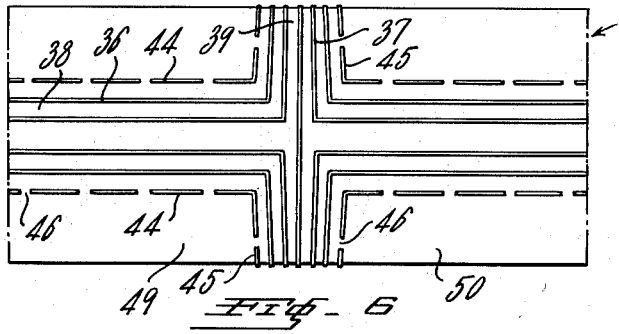
Fig. 6 is a fragmentary plan view on a larger scale of an outer circumferential portion of the inner tube shown in Fig. 4; and, Fig. 7 is a fragmentary plan view of a further modification of the invention.

According to the invention there is provided on the inner tube a plurality of circumferentially extending venting ridges, usually on the outer circumference of the tube, and such ridges are extended radially of the tube to the point where the base of the valve stem assembly is united to the tube. The invention contemplates the provision, at the point where such venting ridges intercept the base of the valve stem assembly, of at least one circular collecting groove passing along the termination of the venting ridges and intersecting escape grooves disposed radially of the base of the valve stem and leading part way up the valve stem itself. In a preferred form of the invention, at least the outer ridges of the plurality of ridges extending around the circumference of the tube are discontinuous, that is, they are provided with periodic spaced breaks, to provide access of air, and especially water, from the remaining surfaces of the tube into the escape channels formed between the venting ridges.

Referring to the drawings, and in particular to Figs. 1 to 3, there is provided an inner tube 10 in the usual annular toroidal form, and having grouped along its outer circumference a plurality of parallel raised ridges 11, in this case six such ridges, symmetrically placed with respect to the outer circumferential center line of the tube, and thereby defining parallel circumferential escape channels 12 for the passage of air or water. At the segment of the tube where the valve stem 13 is located, the ridges make a right angle bend as they approach such segment from either direction. Such right angle bend directs the three ridges on each side of the circumferential center line of the tube surface away from such center line of the tube surface in such manner that the ridges proceed in the form of radial portions 14 to the area of the base 15 of the valve stem assembly. A plurality of radial escape channels 16 are formed between the radial ridges 14 and an additional radial ridge 17 located centrally of the radial ridges 14 and passing substantially completely around the transverse circumference of the tube. The channels 16 formed between the raised radial ridges 14 and 17 are in communication with, and form a continuation of the circumferential channels 12, and lead to the base 15 of the valve stem assembly. The channels 12 and 16 thereby form a system for leading to the base of the valve stem a fluid to be vented from the various remote areas completely around the surface of the inner tube.

For the purpose of collecting the fluid from the termination of the channels at the valve stem base there is provided a depressed circular groove 20 extending circumferentially around the base 15 of the valve assembly near the periphery thereof. The groove 20 intersects the various channels 16 where they terminate at the valve stem base. For the purpose of providing egress for the collected fluid from the channels 16 and circular groove 20, there are provided further depressed grooves 21, in this case six evenly spaced grooves extending radially from the extremity of the valve stem base 15 and having a portion 22 continuing upwardly on the lower part of the valve stem 13 for a distance at least slightly in excess of the thickness or extent of the rim of the wheel with which the tube is to be used. Toward their outer extremities the radial grooves 21 intersect the circular groove 20 and have terminal portions 23 extending beyond such circular groove. The radial grooves 21 are preferably not symmetrically positioned with respect to the raised ridges 14, as best shown in Fig. 2, so that the terminal portions 23 of the radial grooves, for example grooves 21*a* and 21*b*, intersect more than one of the various channels 16, for example channel 16*a* and 16*b*, defined between the ridges 14 and 17. Others of the radial grooves 21, such as grooves 21*c* and 21*d*, terminate in the smooth surface areas 28 and 29 of the tube located at each side of the ridges 14 and aid in venting these areas.

Such an inner tube may be made by extruding a continuous length of inner tube stock of suitable thickness and diameter in tubular form in the usual manner, cutting the tube into suitable lengths, and, after butt splicing the ends of such length together, curing the tube in an enclosing heated mold in the usual manner. The mold surface is provided with suitable grooves for forming the ridges 11, 14 and 17 in the surface of the tube at the desired locations. It will be understood that the valve stem assembly is applied to the uncured tube, usually before the splicing operation, and such assembly is composed of the metal valve tube encased in a covering of partially cured rubber and having a tapered flange like base of partially cured rubber which is pressed onto and adhered to the surface of the inner tube after punching a small hole in the tube to permit entrance of air through the valve. The valve assembly normally has the grooves 20 and 21 impressed on it, as by molding, before it is placed on the tube.

In operation, the tube 10 is placed in the tire casing and mounted on a wheel rim in the usual manner. Any air or water between the tube and casing travels along the circumferential channels 12 defined by the raised ridges 11 to the radially extending channels 16 formed between the radial ridges 14 and 17, whence it passes into the circular collecting groove 20 and into the radial escape grooves 21, which lead the fluid to the outside of the wheel rim through the portions 22 of the grooves extending upwardly on the valve stem 13.

In the modification of the invention shown in Figs. 4, 5 and 6, an inner tube 35 is again provided with a group of circumferential ridges 36 and radial ridges 37, defining circumferential escape channels 38 and radial escape channels 39 leading to the base 40 of a valve stem 41. At the base of the valve stem, a circular collecting groove 42 intersecting the termination of the channels 39 is again provided, as well as radial grooves 43 intersecting the collecting groove 42 and extending upwardly on the valve stem. This modification is characterized by the fact that the outer circumferential ridges 44 and the outer radial ridges 45 are discontinuous, that is, they are interrupted periodically at spaced lengths to provide openings 46 in the ridges. This has been found to be a highly advantageous form of the invention in that it provides more effectively for passage of fluid from remote areas, such as areas 47 and 48 on the surface of the tube, as well as from areas 49 and 50 adjacent the radial ridge system, into the system of venting channels 38, 39. In this way, if any water should enter in between the tube and casing at the otherwise isolated areas 47, 48, 49 or 50, even after the tire is mounted, as through a nail puncture, such water can find its way through the openings 46 into the channel system 38, 39.

Figure 7:
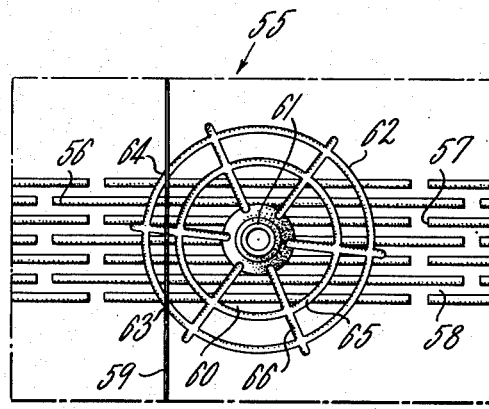

In the modification of the invention shown in Fig. 7 there is provided an inner tube 55 having circumferential ridges (not shown) and radial ridges 56 as before, except that in this case all of the ridges 56 are provided with breaks or openings 57 so that ready access of fluid is permitted to all portions of the venting channels 58 defined by the ridges 56. The inner tube 55 has a parting ridge 59 passing circumferentially around the groove and spaced somewhat to one side of the base 60 of the valve stem 61. This ridge 59 is formed at the parting line of the mold in which the inner tube is cured. An outer circumferential collecting groove 62 is spaced a sufficient distance from the base of the valve stem to intersect the parting ridge 59, as at 63 and 64. In addition, another inner circular collecting groove 65 is provided located on the base of the valve assembly as in the previous modifications. Radial grooves 66 extend part way up the lower portion of the valve stem and pass outwardly across the inner circular groove 65 and the outer circular groove 63, and extend somewhat beyond such outer groove. A collector groove, such as groove 62, intersecting the parting line ridge 59 represents a particularly advantageous aspect of the invention, since such groove prevents the parting ridge from blocking the venting grooves when it passes across the radial ridges and grooves. It is also advantageous to remove, as by buffing, those portions of the parting line ridge which intersect the escape channels.

It has been found by actual testing of inner tubes made in accordance with the invention that the invention provides a suuperior means for escape of water from between the tube and casing, compared to the devices previously used for this purpose. In order to demonstrate this, 180 grams of water were introduced between the inner tube and a 7.10-15 size tire casing, and after standing for a period of 70 minutes the amount of water remaining between the casing and tube was measured. In this way it was observed that when an inner tube of the type shown in Figs. 1 to 3, including a radial collecting groove at the base of the valve stem, such as the groove 20, a minimum quantity of water, viz., about 20 grams, remained between the tube and casing, whereas in a tube which had no circumferential collecting groove 20, but which was otherwise identical, about 130 grams or more of water remained. The small amount of water remaining with the improved inner tube merely represented the amount of water necessary to wet the tube and casing surfaces and it was insufficient to form a pocket that would lead to carcass deterioration or a puncture flex break, whereas the amount of water remaining with the conventional tube was more than sufficient to occasion carcass deterioration or a puncture flex break.

In a similar manner the advantage of providing breaks or discontinuities, such as the openings 46, in the outer circumferential and radial ridges of the venting system, as shown in Fig. 6, was demonstrated. In an inner tube with one-half inch breaks in the outer ridges spaced 6 inches apart on the circumference of the tube only about 20 to 45 grams of water remained between the tube and casing, whereas about 130 grams or more remained when the tube was not provided with such breaks.

Having thus described my invention, what I claim and desire to protect by Letters Patent is:

1. In an inner tube having a venting system including raised ridges defining escape channels disposed circumferentially of the tube and passing radially to the base of a valve stem on the tube, said channels terminating at said base and said valve stem having radially extending grooves extending across its base and up the lower wall of the stem, the improvement which comprises a groove extending circularly of the said valve stem at the base of said valve stem at the termination of said ridges and intersecting said radial grooves whereby fluid in said channels is collected in said circularly extending groove and passed into said radial grooves for escape.

2. In an inner tube having a venting system including raised ridges defining channels leading to the base of a valve stem on the tube, said valve stem base having radial escape grooves leading to said channels and said tube having a parting ridge spaced from said valve base, the improvement which comprises a groove extending around the said valve base circularly of the valve stem and spaced from said base and intersecting said parting ridge and intersecting said radial escape grooves.

3. In an inner tube having a venting system including raised ridges defining channels leading to the base of a valve stem on the tube, said valve stem base having radial escape grooves extending up the lower wall of the stem and leading to said channels and said tube having a parting ridge spaced from said valve base, the improvement which comprises a groove extending around the said valve base circularly of the valve stem and spaced from said base and intersecting said parting ridge and intersecting said radial escape grooves.

4. In an inner tube having a venting system including a plurality of grouped raised ridges that pass along the outer circumference of the tube, the said grouped ridges then turning and passing radially to the base of a valve stem on the tube, said grouped ridges defining continuous uninterrupted escape channels that pass along the outer circumference of the tube and then pass radially from said outer circumference to the said valve base, and said venting system also including grooves disposed radially of said valve stem and passing from terminations of said ridges near said valve base along the surface of said valve base and up the wall of said stem, the improvement which comprises the combination of a series of openings in said ridges disposed periodically at spaced lengths along the circumferential and radial extent of at least the outermost of said grouped ridges, whereby fluid entrapped in remote areas of the tube surface is enabled to pass through said openings of the ridges into the said escape channels, and a groove extending around said valve base circularly of said valve stem at the termination of said ridges to collect the fluid delivered through said escape channels, said circularly extending groove intersecting said radial grooves to give such collected fluid access to said radial grooves.

5. A venting system for an inner tube having a valve stem with a wall extending up from the surface of the inner tube and with a base forming a continuation of the surface of the inner tube, comprising a plurality of grooves in the tube surface extending circularly of the valve stem around the base of the valve stem, and radial grooves in the tube surface extending from the lower portion of the valve stem outwardly across and beyond said circular grooves, and said radial grooves extending up the lower wall of the stem.

6. A venting system for an inner tube having a valve stem with a base forming a continuation of the surface of the inner tube and having a parting ridge in the surface of the tube spaced in proximity to said valve stem, comprising a plurality of grooves in the surface of the tube extending circularly of the valve stem around the base of the valve stem, at least one of said grooves intersecting the said parting ridge, and radial grooves in the surface of the tube extending from the lower portion of the valve stem outwardly across and beyond said circular grooves.

References Cited in the file of this patent

UNITED STATES PATENTS

| Number | Name | Date |
|---|---|---|
| 1,384,244 | Disbrow | July 12, 1921 |
| 2,041,534 | Eger | May 19, 1936 |
| 2,339,548 | Wilson | Jan. 18, 1944 |
| 2,535,120 | Cady et al. | Dec. 26, 1950 |

FOREIGN PATENTS

| Number | Country | Date |
|---|---|---|
| 549,264 | France | Nov. 14, 1922 |